March 3, 1959 R. C. HOFF 2,876,415
MAGNETIC INDICATING DEVICE
Filed Sept. 8, 1953 2 Sheets-Sheet 1
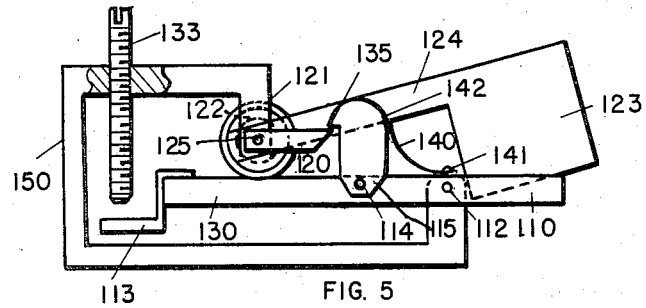
FIG. 5
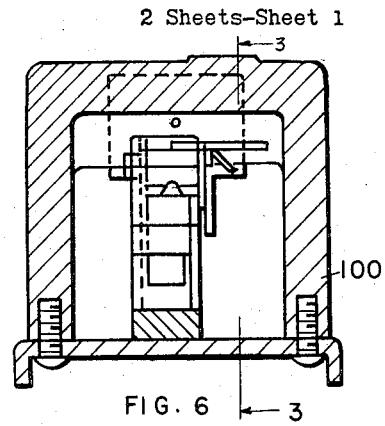
FIG. 6
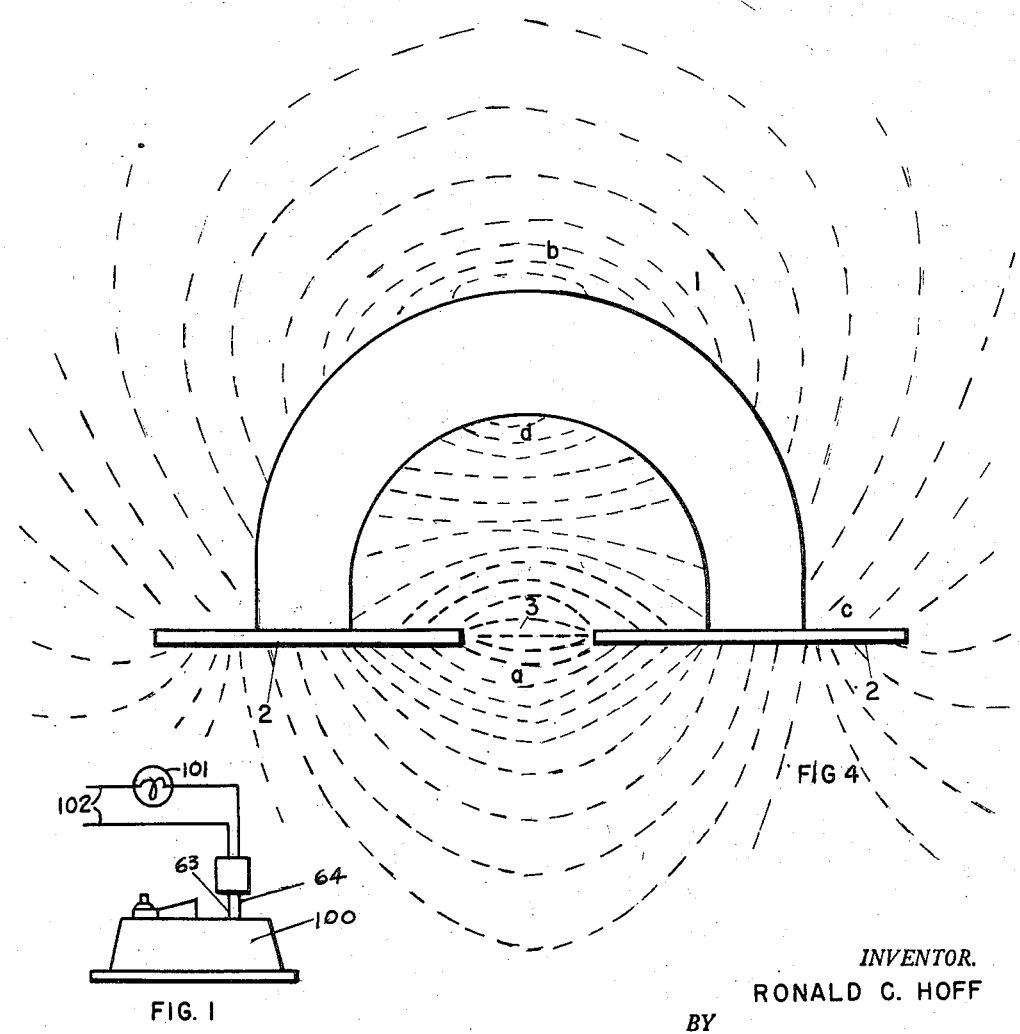
FIG. 4
FIG. 1
INVENTOR.
RONALD C. HOFF
BY
Charles L. Lovenheck
attorney March 3, 1959   R. C. HOFF   2,876,415
MAGNETIC INDICATING DEVICE Filed Sept. 8, 1953   2 Sheets-Sheet 2

INVENTOR.
RONALD C. HOFF
BY
Charles L. Lovercheck
attorney

United States Patent Office 2,876,415
Patented Mar. 3, 1959

2,876,415

MAGNETIC INDICATING DEVICE

Ronald C. Hoff, Erie, Pa., assignor to Eriez Manufacturing Company, Erie, Pa., a corporation of Pennsylvania Application September 8, 1953, Serial No. 378,782

11 Claims. (Cl. 324—43)

This invention relates to instruments and more particularly to instruments for measuring the change of permeance of a permanent or electromagnetic circuit to provide an indication of the degree of such permeance change.

Magnetic equipment used for collecting scrap and tramp iron in manufacturing and other processes and applications is reduced in effectiveness as pieces of iron collect and bridge the magnetic gap. As scrap and tramp iron pieces collect on the magnet and bridge the magnetic gap, the effectiveness of the magnet is decreased until a point is reached where it becomes important to remove the iron pieces from the magnet to restore its effectiveness. At present, no practical indicating instrument is known which will indicate a change in permeance to remind the operator that the magnet should be cleaned; that is, the iron pieces should be removed therefrom.

It is, accordingly, an object of my invention to provide an indicating instrument for use in combination with a magnetic separating device to indicate when the iron particles collected thereon should be removed.

Another object of the invention is to provide an instrument for measuring magnetic field strength.

Another object of my invention is to provide a positive electrical indicating means for indicating or detecting the degree of change of permeance of a magnetic circuit.

Another object of my invention is to provide a positive mechanical indication means to indicate the degree of change of permeance of a magnetic circuit.

A further object of the invention is to provide a novel adjusting element in an instrument for indicating permeance change in a magnetic circuit.

Another object of the invention is to provide a device wherein the action of the magnetic material in the instrument will react to provide an indication or measure of permeance change.

Another object of my invention is to provide an instrument for indicating permeance change in a magnetic circuit which will be simple in construction, economcial in manufacture, and simple and efficient in use.

With the above and other objects in view, the present invention consists of the combination and arrangement of parts hereinafter more fully described, illustrated in the accompanying drawings, and more particularly pointed out in the appended claims, it being understood that changes may be made in the form, size, proportions, and minor details of construction without departing from the spirit or sacrificing any of the advantages of the invention.

In the drawings:

Fig. 1 shows an instrument for indicating the change of permeance of a magnetic circuit;

Fig. 4 shows a magnetic circuit to illustrate the application of my invention;

Fig. 5 shows another embodiment of my invention; and

Fig. 6 is a cross sectional view taken on line 6—6 of Fig. 2.

Now with more specific reference to the drawings, Fig. 4 illustrates the flux pattern of a magnetic field created by a permanent horseshoe type magnet such as is commonly used in plate type magnetic separators. Similar flux patterns are to be found in connection with other types of magnets. The portions of the field or maxwells between points on the face of the pole pieces 2 will be considered the useful flux or the main flux field. All other portions of the field or maxwells will be termed as the stray flux field. The main flux field, together with the stray flux field, constitute the total external field. The relationship between these portions of the total external field is paramount to the operation of this invention. Assume the flux densities or maxwells at $a$, $b$, $c$, and $d$ to be as indicated on the figure. As magnetic material is placed or accumulates across or in the vicinity of the gap 3, the permeance of the circuit formed by the magnet 1, pole pieces 2, and the gap 3 increases, resulting in a decrease of maxwells in the main flux field. It has been discovered that a decrease will also occur in the same proportion in the stray flux field. The utilization of this effect is further set forth below.

Figure 2:
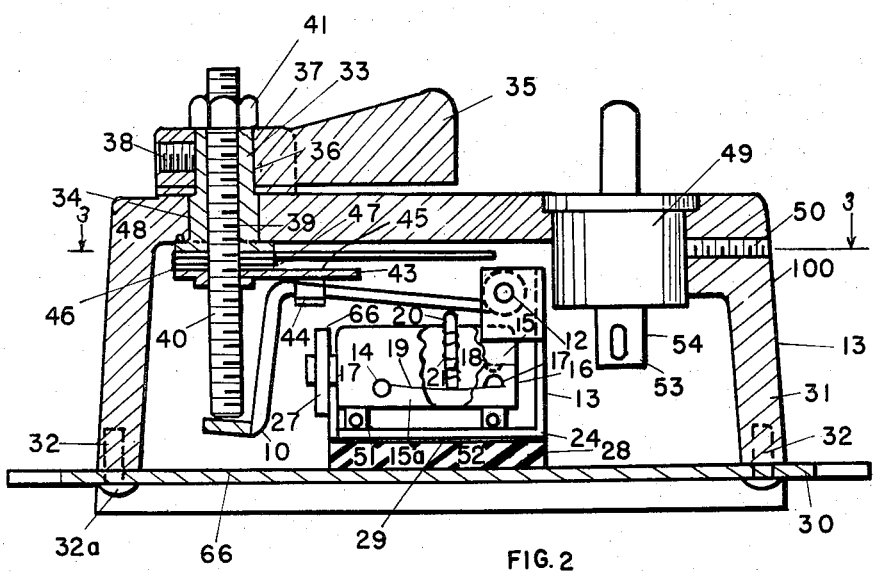
Fig. 2 shows a longitudinal cross section of the magnetic instrument taken on line 2—2 of Fig. 3.
Figure 3:
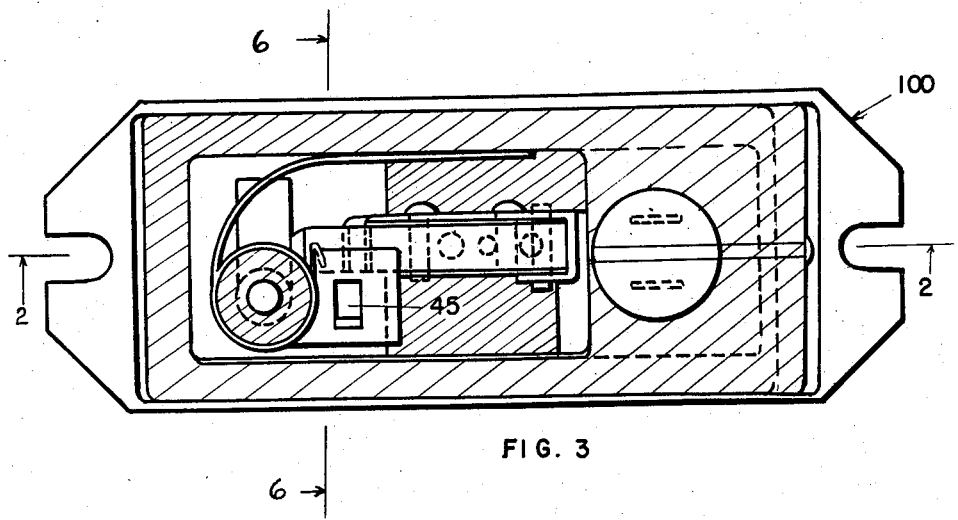
Fig. 3 shows a cross sectional view taken on line 3—3 of Fig. 6.

In the embodiment of the invention shown in Figs. 1, 2, 3, and 6, I show the instrument 100 having the armature 10 pivoted and free to move about the pin 12 which is secured in the aluminum frame 13. A normally closed switch 15 is also secured to the frame 13 by means of rivets 14. The device could also be constructed to utilize a normally open switch.

The switch 15 is made up of the switch body 16, the movable contact 17, and the fixed contact 18, the movable contact 17 being connected by the connecting spring member 19. The plunger 20 engages the connecting spring 19 between the movable contact 17 to urge the contacts to open position. The plunger 20 is urged upwardly by the springs 21. The switch 15 is of a conventional design and per se constitutes no part of this invention. The switch 15 is insulated from the frame 13 by its own non-metallic case 15a and, further, by an insulator 24 made of a non-electrical conducting material.

The hold down bar 27 is secured to the frame 13 at each of its ends. The assembly made up of the switch 15 and the frame 13 is glued to the resilient shock mount 28 made up of sponge rubber or similar material and the shock mount 28 is glued to the frame 13 at 29. A base plate 30 is secured to the frame 31 by means of drive screws 32.

A collet 33 is disposed in a bore 34 in the frame 31 and is free to rotate therein. The reset knob 35 has a hole 36 therein which recives the upper end 37 of the collet 33 and is secured to the collet 33 by means of set screw 38. Both the reset knob 35 and the collet 33 are made of non-magnetic material, preferably brass or aluminum. Through the threaded bore 39 of the collet 33, the adjusting screw 40 extends. The adjusting screw 40 is made of magnetic material such as iron or mild steel and is secured in position in collet 33 by a lock nut 41.

The reset cam 43 having the downwardly extending camming portion 44 struck out from the aperture 45 is secured to the collet 33 by soldering, brazing, or peening. Encircling the collet 33 is the return spring 46, one end of which is bent to engage the reset cam 43 at 47 and the other end of which rests freely against the frame 31 at 48.

Also located on the frame 31 is the male connector 49 which is secured to the frame 31 by a drive screw 50. The terminals 51 and 52 of the switch 15 are electrically connected to the terminals 53 and 54 of the male connector 49.

The operation of the device is as follows: The device is mounted in the stray field of a magnet. When there is no magnetic material bridging or in proximity to the gap 3 of the pole pieces 2, the maxwells in the main flux field are at a maximum and there are sufficient maxwells in the stray flux field to attract the mild steel armature 10 toward the pole pieces 2 against a force exerted in an opposite direction by the plunger 20 and the spring 21 which urges the plunger 20. The travel of the armature 10 toward the pole piece 2 is limited by its engaging the frame 31 at 66. The stray flux field thus holds the armature 10 against the frame 31 and against the plunger 20, maintaining the contacts 17 and 18 in open position. Therefore, no energy can be supplied to the lamp 101 with the light connected to the power source through cables 102 since switch contacts 17 and 18 are held in open position.

When sufficient magnetic material has accumulated bridging the gap 3 or otherwise entering the main flux field, there will be an increase in the permeance of the circuit and, hence, a decrease in maxwells in the stray flux field. When this decrease has occured to the extent that the holding force of the stray flux field is less than the force of the spring 21, the spring 21 will move the armature 10 and the plunger 20 simultaneously, closing the contacts 17 and 18 and completing the electrical circuit and energizing the lamp 101.

The hold down bar 27 provides a force on the armature 10 in the down position to maintain the armature position firmly against the frame 31, thus materially reducing instability introduced by external sources of mechanical shock and vibration. Since the mild steel hold down bar 27 is also in the stray magnetic field, it becomes a magnet by induction, thus providing the desired holding force acting on the armature 10. The unit is further isolated against shock and vibration by means of the resilient shock mounts 28. Further, the hold down bar 27 influences the degree of permeance change necessary to operate the device by its degree of force opposing the spring 21.

The device can be readily adjusted to respond to a large degree of permeance change by means of the adjusting screw 40 and the sensitivity is sufficient to make it possible to adjust the device to operate on a change of permeance caused by direct contact with or by close proximity of magnetic materials to the magnet. Due to the fact that the adjusting screw 40 is made up of magnetic material such as iron, it itself becomes a magnet due to induction by the stray flux field and it exerts a force on the armature 10 opposite in direction from the force exerted by the stray flux field itself. The magnetic force exerted by the adjusting screw 40 and, hence, the extent of permeance increase necessary to close the electrical circuit can readily be controlled by changing the vertical position of the adjusting screw 40 relative to the armature 10. After the adjustment of the screw 40 is made, it can be locked in position by means of the lock nut 41.

The adjusting screw 40 further acts as a magnetic lockout to hold the armature 10 in the out position once it has made contact with the locking screw 41. Due to the fact that the screw 40 itself is of considerable size, it becomes a relatively powerful magnet with only a few maxwells of stray flux; therefore, screw 40 holds the armature 10 captive once the armature 10 has come in contact with the screw 40.

To reset this device, the armature 10 must be restored to the down position; that is, in contact with frame 31. This is accomplished by the action of the reset knob 35 on the top of the armature 10. The operator grasps the reset knob 35 with his fingers and rotates the collet 33 by means of the reset knob 35 and, in so doing, the cam 44 is rotated therewith and moves the armature 10 to the down position. The magnetic flux from the stray field then holds the armature 10 in this position after the return spring 46 has returned the armature 10 to its original position. The armature 10 will remain in the down position, however, only after the magnetic material has been removed from the gap since then only will the stray flux field be strong enough to hold the armature 10 down against the force of the spring 21.

The device illustrated above may be located on any of the external or the internal faces of the magnet 1 or upon the pole pieces 2 of the magnet.

Another embodiment of my invention is shown in Fig. 5 wherein I show an indicating instrument for measuring and mechanically indicating the change in permeance of the magnetic field. The arm 110 is pivoted and free to move about pin 112. A mild steel or iron armature 113 is attached to the end 130 and a catch 115 is pivoted freely about pin 114. A hook 135 is fixedly attached to the upper end of catch 115 and adapted to engage the end of the cam 120. The end 122 of the spring 121 is fixedly attached to the arm 124 of the device and the other end of the device is fixed to the cam 120. A flag 123 is fixed to the frame 150 which is in turn fixed to the pin 125 and the pin 125 is fixed to rotate with the cam 120. The catch 115 is urged toward cam 120 by spring 140 which is attached to arm 110 by screw 141 and engages catch 115 at 142. When the cam 120 is engaged by the hook 135 on the catch 115, the flag 123 is in a substantially horizontal position as indicated. When the stray flux field is reduced in strength as a result of iron bridging or collecting in proximity to gap 3, the magnetic force on armature 113 will be reduced and the force thereof on arm 110 will be overcome by spring 140 which is exerting a force to the left and downwardly on catch 115 and, therefore, is exerting a downward force on arm 110 through pin 114 and arm 110 and catch 115 will rotate, releasing catch 115 from cam 120 and spring 121 will exert a rotative force on arm 124, moving flag 123 to a vertical position. The mild steel or iron adjusting screw 133 is supported in the frame of the device and it serves to adjust the magnetic sensitivity of the device similar to the adjusting screw in the other embodiment of the invention. To reset the device, the magnet must be cleaned to restore the strength of the stray flux field; then the arm 124 is rotated downward to allow catch 115 to re-engage cam 120.

In this embodiment of my invention, when the permeance of the magnetic circuit changes so that the magnetic flux in the stray field is reduced, the magnetic attraction of the field of the steel armature 113 is reduced so that the arm 110 moves upward, allowing the catch 115 to disengage the cam 120 and, thereby, allow the spring 121 to rotate the flag 123 to an upward position. The flag 123 in the raised position indicates that a given degree of permeance change in the magnetic field has occurred and warns the operator that the magnet should be inspected and iron found thereon removed.

In the foregoing specification, I have set forth the invention in its preferred practical forms but I am aware that the structure shown is capable of modification within a range of equivalents without departing from the invention which is to be understood as broadly novel as is commensurate with the appended claims.

The embodiments of the invention in which an exclusive property or privilege is claimed are defined as follows:

1. A device for indicating a change of permeance in a magnetic circuit comprising a frame, a magnetic armature pivoted to said frame and adapted to be disposed in the stray flux field of a magnetic circuit to be tested, said armature engageable with a signal device, a magnetic member on said frame, said armature defining a gap between it and said frame when in unactuated position, and means to swing said armature into engagement with said magnetic member when said stray field in which said device is disposed weakens, said means to swing said armature comprising a resilient member urging said armature to actuate said signal device, said armature adapted to be urged toward said signal device by said stray flux field, magnetizing a member adjacent said armature whereby said armature is attracted to an actuated position.

2. The device recited in claim 1 wherein a magnetizable member is disposed adjacent said armature and engageable therewith to magnetically hold said armature in actuated position.

3. The device recited in claim 2 wherein a magnetic holding bar is disposed on said device and engageable with said armature to hold it in unactuated position.

4. The device recited in claim 3 wherein a reset cam is mounted on said frame and adapted to engage said armature to move it to unactuating position.

5. A device for indicating a change in permeance of a magnetic circuit comprising a frame, a magnetic armature swingably attached to said frame, a catch member pivotally connected to said armature, a signal device pivoted to said frame and held in non-actuated position by said catch, and a resilient member urging said signal device to actuated position, said armature and a member on said frame defining a gap when said armature is in actuated position, and means to swing said armature into engagement with said member to close said gap when a magnetic field weakens.

6. The device recited in claim 5 wherein a magnetic member is supported adjacent said armature and engageable therewith to hold said armature in actuated position.

7. A device for indicating a change in permeance of a magnetic circuit comprising a non-magnetic frame having a base, a magnetic armature pivotally mounted on said frame, a magnetic hold down member attached to said frame and disposed on one side of said armature, a magnetic adjusting screw mounted on said frame and spaced from said hold down member, said armature swingable between said hold down member and said adjusting screw, and a signal device actuable by movement of said armature.

8. The device recited in claim 7 wherein said signal device comprises an electrical switch.

9. A device for indicating the change of permeance of a magnetic circuit comprising a frame, an armature pivoted to said frame at one end thereof to swing thereabout, the other end of said armature being made of magnetic material, a magnetic member on said frame spaced from said armature when said armature is in its unactuated position, said armature adapted to swing into engagement with said magnetic member when said armature is actuated by a means urging said armature toward said magnetic member when a magnetic field in which said device is disposed is weakened, said magnetic member being adapted to be magnetized by a field of a magnet being tested whereby said armature is attracted thereto, and signal means adapted to be actuated by said armature.

10. The device recited in claim 9 wherein a magnetic hold-down bar is attached to said frame in engagement with said armature in its unactuated position and adapted to be magnetized by a field of a magnet to be tested whereby said armature is held in unactuated position.

11. A device for indicating the change of permeance of a magnetic circuit comprising a frame, an armature made of magnetic material swingably connected to said frame and adapted to be disposed in the stray flux field of a magnetic circuit to be tested, means forming a magnetic path with said armature, said armature being swung to a position to form a gap in said magnetic path and held in said swung position by a stray flux field of a magnet adjacent said device, and means for urging said armature to swing to a position to close said gap and thereby actuate a signal, said armature being urged away from said actuating position by a stray flux field, said armature actuating said signal when said stray field is reduced to a predetermined value.

References Cited in the file of this patent
UNITED STATES PATENTS

| | | |
|---|---|---|
| 1,187,054 | Everest | June 13, 1916 |
| 1,778,653 | Wineman | Oct. 14, 1930 |
| 2,384,529 | Breitenstein | Sept. 11, 1945 |
| 2,670,457 | Hartman et al. | Feb. 23, 1954 |